United States Patent [19]

Ackley

[11] 4,308,942
[45] Jan. 5, 1982

[54] SINGLE DRUM MATERIAL ORIENTATION APPARATUS AND METHOD

[76] Inventor: Michael Ackley, 1273 N. Church St., Moorestown, N.J. 08057

[21] Appl. No.: 89,190

[22] Filed: Oct. 29, 1979

[51] Int. Cl.³ .......................................... B65G 47/24
[52] U.S. Cl. ................................... 198/380; 101/40; 198/393; 198/397; 198/408; 221/173
[58] Field of Search ............... 198/380, 392, 407, 384, 198/393, 397, 385, 386, 408; 101/35–40, 426; 221/171–173

[56] References Cited

U.S. PATENT DOCUMENTS 2,785,786  3/1957  Bartlet ................................ 198/398
3,871,295  3/1975  Ackley ............................. 221/173 X Primary Examiner—Robert B. Reeves
Assistant Examiner—Douglas D. Watts
Attorney, Agent, or Firm—Weiser, Stapler & Spivak

[57] ABSTRACT

An apparatus for transferring, in a substantially uniform manner, a plurality of shaped objects, such as tablets, from a hopper adapted to contain a plurality of the tablets to a conveyor system for subsequent processing comprising a transfer drum in rotary arrangement relative to the hopper, adapted to receive the tablets within a plurality of peripherally spaced cavities having a substantially radially aligned pocket and a communicating, substantially longitudinally aligned pocket, a guide for re-orienting the tablets from the substantially radial orientation in which the tablets are received by the cavities, to a substantially longitudinal direction, and carriers operatively associated with the conveyor system to receive the substantially longitudinally oriented tablets in a substantially longitudinal orientation. Also the method.

46 Claims, 5 Drawing Figures

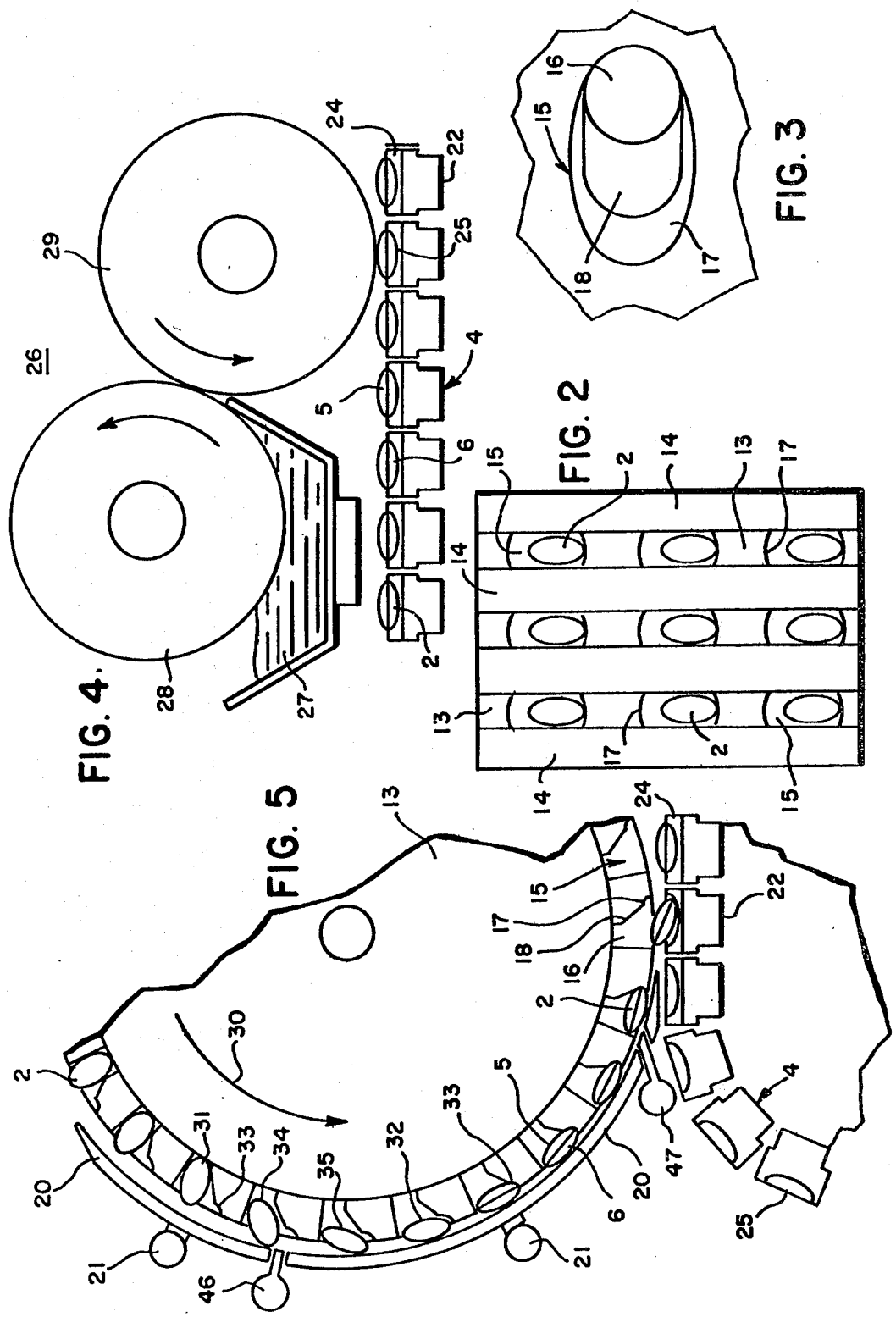

SINGLE DRUM MATERIAL ORIENTATION APPARATUS AND METHOD

TECHNICAL FIELD

This application relates generally to the field of tablet orienting apparatus and more particularly, is directed to a single drum type of tablet orientation or rectification apparatus including a plurality of tangential cavities which function with other means to uniformly orient randomly fed tablets.

It is the usual practice to package medicinal compounds and various other materials in tablets which are made and used in very large numbers. The tablets generally consist of bodies of predetermined size and configuration which are at least in part formed of the medicinal or other compounds.

During the processing of these tablets, it is common practice to imprint indicia over the surface of the tablet, for example the name of the manufacturer or of the name or batch number of the material forming the tablet or other information required by the Food and Drug Administration or other agencies. This can be done by any suitable printing process. The tablets are preferably uniformly oriented or rectified prior to reaching the imprinting station to reduce slippage between the imprinting head and the tablet surface whereby a sharp, precise, printed indicia can be produced on each tablet as it passes through the imprinting station.

BACKGROUND OF THE INVENTION

Prior workers in the art have developed apparatus capable of transporting, orienting, rectifying and in other appropriate ways positioning, etc. tablets (or capsules) such as are disclosed in the following U.S. Pat. Nos., which may be considered representative of the prior art:

2,787,786, R. J. Bartlett, CONVEYING APPARATUS
2,859,689, A. Ackley, PELLET MARKING MACHINE
2,931,292, C. E. Ackley, MARKING MACHINES
2,982,234, C. E. Ackley and John Kane, METHOD OF PRINTING WAXED PELLETS, AND PRINTING INK
3,026,792, J. J. Misket et al, APPARATUS FOR BRANDING UNIFORMLY-SHAPED ARTICLES
3,042,183, C. E. Ackley, ARTICLE HANDLING APPARATUS
3,200,556, C. E. Ackley, CAPSULE SEALING METHOD AND APPARATUS
3,272,118, C. E. Ackley, ARTICLE MARKING MACHINE
3,613,861, Alten E. Whitecar, CAPSULE ORIENTING MACHINE
3,739,909, Garland et al, CAPSULE HANDLING APPARATUS AND METHOD
3,838,766, Wagers, Jr. et al, CAPSULE INSPECTION APPARATUS AND METHOD
3,868,900, Edward M. Ackley, CAPSULE PRECISION PRINTING APPARATUS AND METHOD
3,871,295, Edward M. Ackley, CAPSULE ORIENTING APPARATUS AND METHOD OF SPIN PRINTING
3,884,143, Edward M. Ackley, CONVEYOR LINK FOR TABLET PRINTING APPARATUS
3,912,120, Hoppmann et al, CENTRIFUGAL METHOD OF SORTING AND ORIENTING PARTICULATE ARTICLES
3,917,055, VandenBerg et al, CAPSULE RECTIFICATION APPARATUS
3,931,884, Edward M. Ackley, APPARATUS FOR TRANSPORTING AND AND ORIENTING CAPSULES
4,069,753, Edward M. Ackley, deceased, APPARATUS AND METHODS FOR THE RANDOM SPIN PRINTING OF CAPSULES U.S. Pat. Nos. 3,931,884 and 4,069,753 show "spin printing" apparatus, and U.S. Pat. Nos. 2,785,786; 2,859,689; 3,026,792 and 3,424,082, show other apparatus and method for branding or printing indicia on the article.

Although the tablet orientation machinery of the prior art has operated satisfactorily in many applications, it has nevertheless been found that such machinery is capable of improvement.

Tablets introduced into a hopper for orientation and delivery to a printing station generally become randomly oriented. It therefore becomes necessary to uniformly orient such tablets, to assure proper printing of any indicia thereon.

Tablet orientation machinery capable of rectifying the tablets for printing has been developed, however such machinery is generally not capable of satisfactory operation at substantial rates of production.

As the production rate of the apparatus is increased either tablets begin to feed into the classifying means improperly, or not at all. The overall efficiency of such devices correspondingly decreases, since the number of properly classfied tablets delivered from the apparatus decreases.

The present apparatus represents an improvement over the prior art tablet orientation machines for many reasons, e.g. more versatile, greater efficiency and for other reasons as will become apparent from the further description. It provides a reliable, automatic and rapidly functioning device capable of rapidly and uniformly orienting a plurality of randomly fed tablets.

In view of these patents and a fairly advanced state of technology, the present machinery and method is quite unobvious and represents a further significant advance in the art.

SUMMARY OF THE INVENTION

In accordance with the present invention, tablets are introduced into a hopper for classification utilizing a single drum type apparatus.

Generally, tablets of the type to be classified by the present apparatus are eliptical in shape, having two symmetrical faces. However, the present apparatus is also equally capable of classifying tablets having other cross-sectional shapes, such as rectangles, squares, or circles.

The tablets are first classified by a series of fingers positioned at the bottom of the hopper. The fingers of the hopper are spaced apart so that tablets will fall between the fingers in an edgewise manner. The faces of the tablets are maintained adjacent to the fingers, the peripheral edge of the tablets resting on the bottom of the hopper.

These tablets are endwise fed into a plurality of cavities peripherally located along the transfer drum which is in rotational arrangement with the hopper. The cavities are provided with radially aligned pockets and communicating longitudinally aligned pockets. The respective pockets are provided with a sloping surface positioned between them to assist in the proper orientation of the tablets.

The tablets are endwise fed into the radially aligned pockets of the cavities. It has been found that introducing tablets into relatively deep pockets increases the number of tablets which are properly classified by the apparatus, increasing its efficiency. Providing a cavity in accordance with the present invention permits the utilization of such deep pockets, without sacrificing reliability.

At this point the tablets are resting in the radially aligned pockets of the cavities with their major axis radially aligned, and with their faces transversely positioned. It then becomes necessary to re-orient these tablets for proper delivery to the printing apparatus.

To assure the proper positioning of the tablets within the cavities a brush mechanism may optionally be provided, to jostle the tablets into their proper position.

The tablets are next transferred to a means for reorientation, preferably an arcute back guide which, in cooperation with the configuration of the cavities, serves to properly orient the tablets.

The tablets are then allowed to endwise "fall" out of the radially aligned pocket into the longitudinally aligned pocket. In this manner the major axis of the tablets is re-oriented from a radial to a longitudinal direction.

Also during this process, the tablets are caused to rotate about their major axis. This rotation is provided by the sloping surface of the cavities, which is inclined between the pockets, and also transversely across the cavities. In this manner, a tablet which is falling from the radially aligned pocket to the longitudinally aligned pocket is also caused to rotate so that one of its faces is directed radially inward, the other radially outward. This orientation is assisted by the shape of the longitudinally aligned pocket, which is configured to accept therein only a tablet which is properly oriented.

The so-oriented tablet is then delivered from the transfer drum to a conveyor means which then delivers the tablets for subsequent processing, such as printing. To this end, the conveyor means is provided with a plurality of carriers having cavities conformed to the shape and orientation of the tablets delivered from the transfer drum.

The tablets are then drawn by the conveyor means to the printing apparatus so that any desired indicia may be imprinted thereon. The carriers of the conveyor means serve to properly position the oriented tablets during the printing process. The increased reliability and efficiency of the apparatus enables greater rates of production to be safely obtained.

In order to further increase the rate of production obtainable using the foregoing apparatus, and the above described method for re-orienting the tablets, a series of rows, each of which is capable of tablet re-orientation, may be produced in a single apparatus. In such case the transfer drum, the fingers of the hopper, and the carriers of the conveyor means, would each be configured so that each portion of the apparatus has an equivalent number of tablet orienting rows. The number of rows may be varied to suit a given application.

The foregoing apparatus and method for orienting a plurality of tablets is capable of operating solely due to the influences of gravity. This includes feeding the tablets from the hopper to the transfer drum, re-orienting the tablets within the back guide, and delivering the tablets from the transfer drum to the conveyor means. It is also possible to provide additional means, to assist in these operations.

Air chests, provided with positive or negative pressures, may be used to assist in these operations. Air jets, which jostle the tables, assisting in this movement, may also be used if desired. A variety of combinations of these are also possible.

It is therefore an object of the present invention to provide an improved tablet rectification apparatus of the type set forth.

It is another object of the present invention to provide a novel tablet rectification apparatus that is completely automatic in operation and which is designed to simply and speedily rectify a plurality of randomly fed tablets.

It is another object of the present invention to provide a novel tablet rectification apparatus that is capable of properly orienting the tablets for the printing thereon of selected indicia.

It is an important object of the present invention to provide an apparatus wherein the tablets are rectified and oriented in a single direction, longitudinally positioned with respect to the printing apparatus used to print indicia on the tablets.

It is another object of the present invention to provide a novel tablet rectification apparatus comprising a single transfer drum, a back guide means provided in association with the transfer drum to properly orient the tablets for eventual printing or other processing, and conveyor means to receive the properly oriented tablets for subsequent processing.

In accordance with the invention, the tablets may be so deposited on the conveyor means in a position ideally suited for printing the tablets positioned in longitudinal orientation with the direction of travel.

It is another object of the present invention to provide a novel tablet rectification apparatus comprising a hopper containing a large number of tablets in random arrangement, a single transfer drum means and a guide means, all of which are adapted to sort out and orient the tablets so that they are uniformly longitudinally oriented with respect to the direction of travel.

It is another object of the present invention to provide a novel tablet rectification apparatus that is simple in design, yet versatile and efficient.

Other objects and a fuller understanding of the invention will be had by referring to the following description and claims of a preferred embodiment thereof, taken in conjunction with the accompanying drawings, wherein like reference characters refer to similar parts throughout the several views, and in which:

BRIEF DESCRIPTION OF THE DRAWINGS

FIG. 2 is a partial, top plan view taken along line 2—2 of FIG. 1, looking in the direction of the arrows.

FIG. 3 is a partial, top plane view taken along line 3—3 of FIG. 1, looking in the direction of the arrows.

FIG. 4 is a partial, side elevational view, partly in section, of a printing apparatus used in conjunction with the invention.

FIG. 5 is a partial, cross-sectional view illustrating an alternative embodiment of the apparatus shown in FIG 1.

DESCRIPTION OF THE PREFERRED EMBODIMENT OF THE INVENTION

Figure 1:
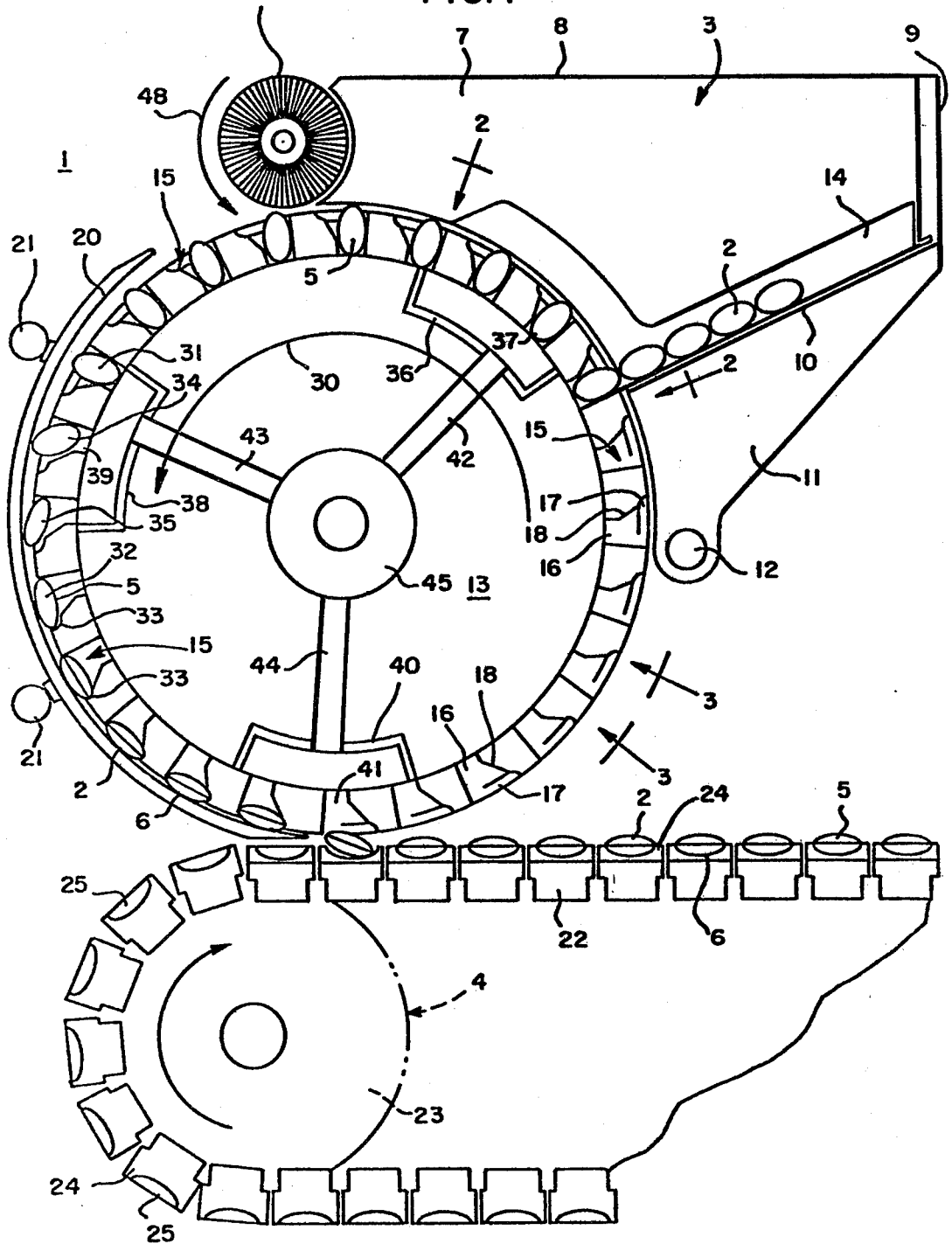
FIG. 1 is a cross sectional view illustrating the preferred embodiment of the invention.

Although specific terms are used in the following description for the sake of clarity, these terms are intended to refer only to the particular structure of the invention selected for illustration in the drawings, and are not intended to define or limit the scope of the invention.

Referring now to the drawings, there is shown in FIG. 1 an apparatus 1 for delivering tablets 2 from hopper 3 to conveyor means 4, for subsequent processing. This processing typically includes the printing of indicia upon the tablets 2 as they are conveyed by conveyor means 4.

The tablets 2 which may be processed by apparatus 1 are generally symmetrical, having a pair of faces 5,6 which may be flat or curved depending upon the application. Tablets 2 having elliptical shapes are illustrated, however tablets having other shapes could also be accommodated by apparatus 1, e.g. circular or rectangular. Tablets of this type are often used in the pharmaceutical industry, as well as by candy manufacturers. Other uses are clearly possible.

A hopper 3 is provided along the uppermost portion of apparatus 1 to receive therein a plurality of tablets 2. The hopper 3 is defined by a pair of sides 7,8, a back 9, and a sloping feed tray 10. The hopper 3 may, if desired, be positioned upon a bracket 11 which is pivoted at 12. Pivoting the hopper 3 allows the hopper 3 to be rotated away from the transfer drum 13, the details of which will be described below, in order to clean the apparatus 1, or to remove tablets 2 which may inadvertently interrupt operation of the apparatus, e.g. defective tablets or tables which have become jammed in the apparatus 1.

Hopper 3 is also provided with a plurality of juxtaposed, spaced guides or fingers 14. Each of these fingers extends downward along the feed tray 10, and then upward along the transfer drum 13, contouring to the curvature of the transfer drum 13. As illustrated in FIG. 2, these fingers 14 create a series of openings or grooves into which tablets 2 may drop, for subsequent introduction into the transfer drum 13. The spacing between respective fingers 14 will be more fully discussed below. The number of fingers 14 used may be varied according to need.

The transfer drum 13, which rotates beneath the hopper 3, is positioned to receive tablets 2 from the hopper 3 within a plurality of cavities 15. The cavities 15 are preferably regularly spaced around the substantially circular circumference of the drum 13. The cavities 15 may be positioned in a series of rows circumferentially extending around the transfer drum 13, permitting the transfer drum 13 to accomodate a greater number of tablets 2 during operation. The number of rows of cavities 15 used may be varied, however the number of rows used should correspond to the number of openings defined between adjacent pairs of fingers 14 of the hopper 3.

As illustrated in FIG. 3, cavities 15 of the transfer drum 13 comprise a pair of communicating pockets; a first, substantially radially disposed pocket 16, and a second, substantially longitudinally disposed pocket 17. Radially disposed pocket 16 is sized to essentially correspond to the major, cross-sectional dimension of the tablet 2, enabling the tablet 2 to enter the radial pocket 16 endwise, with its edge facing the communicating longitudinal pocket 17. The longitudinal pocket 17 is sized to receive one of the faces 5 of the tablet 2, being too small to receive the tablet 2 in the endwise manner in which it is positioned in the radial pocket 16. A sloping surface 18 is also provided, extending between the radially disposed pocket 16 and the longitudinally disposed pocket 17 to assist the tablets 2 in the re-orientation process, as will be described below.

Optionally provided at the end of hopper 3 opposite to the back 9 is a brush assembly 19. Brush assembly 19 is adapted to rotate in the direction shown by the arrow at 48, and is optionally used to dislodge and brush back into the hopper 3 any tablets 2 which are improperly positioned within the transfer drum 13. Brush 19 also serves to properly position within the radially aligned pockets 16 of the cavities 15, tablets 2 which have been improperly introduced into the cavities 15.

Circumferentially extending over portions of the transfer drum 13 is a means for re-orienting the tablets 2, from a radial to a longitudinal orientation, such as the back guide 20 illustrated in FIG. 1. The back guide 20 may be positioned relative to the transfer drum 13 by mounting hardware 21. The position of back guide 20 with respect to transfer drum 13 may be varied, by adjusting the mounting hardware 21, toward or away from the transfer drum 13 as needed, allowing a variety of sizes of tablets 2 to be accomodated.

Back guide 20 circumferentially extends around the transfer drum 13 from a point near the top of the apparatus 1, just beyond hopper 3 to a point near the bottom of the transfer drum 13, just before the transfer drum 13 is brought into alignment with the conveyor means 4. As illustrated in FIG. 1, the forwardmost end of back guide 20 is preferably farther away from the transfer drum 13 than is its lattermost end. This differential assists the tablets 2 in their re-orientation within the cavities 15.

Just after the point where the back guide 20 ends, the cavities of the transfer drum are positioned to communicate with the conveyor means 4. Conveyor means 4 generally comprises an endless chain or cog-belt 22 adapted to extend around a plurality of transport pulleys or sprockets, one of which is illustrated in FIG. 1 at 23. Each link of the chain or belt 22 is provided with a carrier 24 capable of accepting a tablet 2 from the transfer drum 13.

Each carrier 24 is provided with cavities 25 capable of accepting and retaining therein the tablets 2. The cavities 24 will therefore be dimensioned in accordance with the shape of the tablet 2 being processed by apparatus 1, and will be aligned in accordance with the positioning of the tablet 2 in the longitudinal pocket 17 of the cavities 15. For the tablets 2 illustrated, the cavities 25 would preferably be elliptically shaped, in order to receive the curved face 6 of the tablets 2.

Each carrier 24 may be provided with a plurality of cavities 25, in order to communicate with, and accept tablets 2 from, each of a plurality of rows of cavities 15 provided in transfer drum 13.

Tablets 2, in their proper orientation, are then transferred by the conveyor means 4 to a printing apparatus 26, such as is illustrated in FIG. 4. In that figure there is illustrated a printing apparatus which includes a reservoir 27 for a suitable marking ink or die, transfer roll 28 and printing roll 29. The printing roll 29 is continuously rotated as shown, being brought into contact with each tablet 2 as it is passed beneath the roll 29. The printing of information on each tablet may also be accomplished using other techniques, either with the tablet 2 being longitudinally, or transversely, aligned with respect to the conveyor means 4.

In operation, a plurality of randomly oriented tablets 2 are placed in the hopper 3 of apparatus 1. Tablets 2 will thus fill the hopper 3 placing pressure upon those at the bottom-most portions of the hopper 3. This pressure will cause some of the tablets 2 to enter the spaces defined between adjacent fingers 14.

Fingers 14 are spaced so that tablets 2 falling therebetween will do so in an edgewise orientation, the faces 5,6 of the tablets 2 abutting the fingers 14 of the hopper 3. In this position, the tablets, seeking a stable orientation, will orient themselves so that the ends of each tablet 2 are at substantially equal heights, placing the major axis of each tablet essentially parallel to the feed tray 10 of the hopper 3. At this point the tablets 2 will be aligned substantially as shown in FIG. 1.

The so-oriented tablets 2 are now ready to be received by the transfer drum 13. As the drum rotates, in the direction of the arrow illustrated in FIG. 1 at 30, cavities 15 of that transfer drum 13 are brought into alignment with the tablets 2 which are oriented and waiting in the hopper 3. The tablets 2 are then allowed to slide, by gravity, into the radial pocket 16 of the cavities 15. The configuration of each cavity 15, as illustrated in FIG. 3, is particularly adapted to receive a tablet 2, and maintain that tablet 2, in a position such that one of the ends of the tablet 2 is positioned radially downward, and so that the faces 5,6 of the tablet 2 are positioned transversely to the direction of travel of the transfer drum 13.

The transfer drum is then rotated away from that position, allowing subsequent tablets 2 to be uniformly accepted into subsequent cavities 15 of the transfer drum 13.

The transfer drum 13, and the cavities 15 containing the tablets 2, are then preferably brought into contact with a rotating brush assembly 19. This is done to assure the tablets 2 are properly seated in the radial pockets 16 of the cavities 15, and to brush any improperly positioned tablets back into the hopper 3 for subsequent processing.

In this manner the tablets 2 are passed beneath the back guide 20, for re-orientation, as shown at 31. As the tablets 2 are drawn beneath the back guide 20, the transfer drum is beginning its downward travel. As this continues the tablet 2 is caused to "fall" out of the radially aligned pocket 16. This falling is assisted by the spacing provided between the back guide 20 and the transfer drum 13. As the tablet 2 falls it is guided, by the back guide 20 and the configuration of the cavity 15, into its new orientation. In this new orientation, shown at 32, the tablet 2 is resting in the longitudinally aligned pocket of the cavity 15, with its major axis extending in a longitudinal direction, and with one of its faces 5 (the face which will subsequently receive the printed indicia thereon) facing radially inwardly. The tablet 2 has therefore undergone two changes in orientation. The major axis of the tablet 2 has been re-oriented, from a radial to a longitudinal direction, shown at 34 in FIG. 1. The faces 5,6 of the tablet 2 have been re-oriented, from a transverse, to a longitudinal position, shown at 35 in FIG. 1.

These changes are caused primarily by the configuration of the cavities 15, and the spacing between the transfer drum 13 and the back guide 20.

Each cavity 15 has two pockets which communicate with each other along a sloping surface 18. This sloping surface not only connects the pockets 16,17 longitudinally but also is inclined in a direction transverse to the direction of rotation, inclining upwardly as one looks into the page in FIG. 1. In this manner, the tablet 2 which is falling out of the radially aligned pocket 16 is caused to rotate about its major and minor axis toward the longitudinally aligned pocket 17.

The longitudinally aligned pocket 17 is configured to accept the tablets 2 only in the orientation desired. To this end, the forwardmost tip 33 of the longitudinally aligned pocket 17 is sized so that it will only accept the end of a tablet 2 which is longitudinally oriented, with its faces facing radially inwardly and outwardly. In this manner, the tablet 2, which is caused to rotate by the sloping surface 18 of the cavity 13 is caught and positioned by the longitudinally aligned pocket 17 in the desired manner. These tablets are then retained in the longitudinally aligned pocket 17 by the back guide 20, which is positioned closer and closer to the transfer drum 13 as it proceeds toward the conveyor means 4. The face 5 of the tablet 2 which is to receive the printed indicia is held in position by the tip 33 of the pocket 17. The face 6 of the tablet which is opposite the face 5 is held in position by the back guide 20.

At the position shown at 41 the back guide 20 ends. At this point the carriers 24 of the conveyor means 4 are brought into position beneath the transfer drum 13. The cavities 25 of the carrier 24 are brought into alignment with the cavities 15 of the transfer drum 13. Since the cavities 15, 25 have essentially the same shape, the tablet 2 is transferred from the drum 13 to the carriers 24 while still being maintained in its desired orientation. The tablets 2 are then conveyed to the printing means 26 whereupon the face 5 of each tablet 2 is provided with the desired indicia. The tablets are then conveyed to subsequent processing steps.

The emptied cavities 15 are returned to the hopper 3 where additional tablets 2 are introduced therein. The emptied cavities 25 are returned by the endless conveyor means to receive newly oriented tablets 2 for printing and subsequent processing. As may be appreciated, the foregoing may be performed on a continuous basis, serving well to accomplish the objectives previously set forth.

Variations of the foregoing apparatus and method are clearly possible.

For example, in the foregoing description, movement of tablets 2 between respective portions of apparatus 1 is primarily accomplished by gravitational forces. Tablets 2 are permitted to drop from hopper 3 into radially aligned pocket 16. As the tablets 2 are rotated beneath the back guide 20, the tablets 2 are permitted to drop into the longitudinally aligned pockets 17. As the tablets 2 are delivered from the transfer drum 13 to the conveyor means 4, the tablets 2 are permitted to drop from the longitudinally aligned pocket 17 into the cavities 25 of the carrier 24. However, it is also possible, although not necessary for proper operation of the foregoing apparatus 1, to provide various means for assisting the transfer of the tablets 2 between respective portions of the apparatus 1.

In FIG. 1 there is illustrated one such transfer assisting means.

To assist in the transfer of tablets 2 from hopper 3 to the cavities 15 of transfer drum 13 a first air chest 36 may be provided. Air chest 36 comprises a walled chest which is open at one end, which open end is capable of communicating with the cavities 15 of transfer drum 13.

A vacuum is then created in the air chest 36. This vacuum operates on the tablet 2 through the open end 37 of cavity 15 to pull the tablet 2 into position, properly seating that tablet 2 within the radially aligned pocket 16 of the cavity 15. Such vacuum assistance aids in increasing the efficiency of the apparatus 1.

To assist in the re-orientation of the tablets 2, a second air chest 38 may also be provided. Air chest 38 also includes an open end which communicates with the cavities 15 of the transfer drum 13, through openings 39. By applying positive pressure to air chest 38, tablets 2 in the radially aligned pocket 16 are pushed out of the radially aligned pocket 16 and into the longitudinally aligned pocket 17, again increasing the efficiency of the apparatus 1.

To assist in transferring the tablets 2 from the longitudinally aligned pocket 17 to the carriers 24 of conveyor means 4, a third air chest 40 may be provided. Air chest 40 is also provided with an open end which communicates with the cavities 15 of transfer drum 13, through openings 41. Applying positive pressure to air chest 40 pushes tablets 2 out of the longitudinally aligned pockets 17 and onto the carriers 24.

Air chest 36 may be provided with a vacuum through tube 42. Air chests 38,40 may be provided with positive pressure through tubes 43,44. Tubes 43,43,44 may then be connected to manifold 45 which connects the air chests 36,38,40 to the means necessary to supply a vacuum and positive pressure to the apparatus 1.

As illustrated in FIG. 5, the foregoing assistance may also be provided by jets of air introduced into the system as shown.

A tablet 2 which is being re-oriented within the back guide 20 may be assisted in its movement by a jet of air directed into cavity 15 by nozzle 46. The jet of air so introduced dislodges the tablet 2 and causes it to float to a limited extent, assisting its transfer from the radially aligned pocket 16 to the longitudinally aligned pocket 17.

A tablet 2 which is being delivered from the transfer drum 13 to the carriers 24 may be assisted in its movement by a jet of air directed into cavity 15 by nozzle 47. The jet of air so introduced serves to dislodge the tablet 2 and allow it to float to a limited extent, assisting it in dropping into the cavity 25 of carriers 24.

Although the air chests 36,38,40 are each illustrated in FIG. 1, it is not required that all three air chests be used. Such air chests may be used individually as desired. The same also applies to the air jet nozzles 46,47. It is also possible to combine the use of air chests and nozzles in a single application if desired.

Variations in the shape of the cavities 15,25 and carriers 24 are also possible. As previously mentioned, tablets 2 having a wide variety of shapes may be handled by apparatus 1. The pockets 16,17 of the cavities 15, as well as the sloping surface 18, may all be varied to accomodate these various tablets 2. The cavities 25 of carriers 24 may also be suitably modified to accept tablets 2 of various shapes.

As previously mentioned, the position of back guide 20 may also be adjusted, to accomodate tablets 2 of various sizes and shapes.

Although the invention has been described with a certain degree of particularity, it is understood that the present disclosure has been made only by way of example and that numerous changes in the details of parts may be resorted to without departing from the scope of the invention.

What is claimed is:

1. An apparatus for transferring, in a substantially uniform, from a radial to a longitudinal orientation, a plurality of shaped objects from a hopper adapted to contain a plurality of the objects, which apparatus comprises transfer drum means in rotary arrangement relative to the hopper, adapted to receive the objects in a radial position from the hopper within a plurality of peripherally spaced cavities, the cavities comprising a first, substantially radially aligned pocket which communicates with a second, substantially longitudinally aligned pocket, the objects being received in the cavities in a radial orientation in the radial pocket, means for re-orienting the objects, assisted by the transfer drum means, from the substantially radial orientation to a substantially longitudinal orientation within the substantially longitudinally aligned pocket which communicates with the substantially radially aligned pocket, wherein substantially the objects which have been received by the transfer drum means are re-oriented from a substantially radial orientation to a substantially longitudinal orientation, and means for receiving the longitudinally oriented objects from the transfer drum means in a substantially longitudinal orientation independent of the radial position of the pocket, which receiving means is operatively associated with the conveyor means.

2. The apparatus of claim 1 wherein the cavities further comprise a surface which slopes between the radial pocket and the longitudinal pocket, and which also inclines in the direction of rotation of the drum means and extends transverse to the direction of rotation of the drum means.

3. The apparatus of claim 1 wherein the object is a tablet having a peripheral edge separating two substantially symmetrical faces, and wherein the radial pocket of the drum means is configured to retain therein the tablet so that the peripheral edge of the tablet is radially aligned, and so that the faces of the tablet are aligned generally parallel with the direction of travel of the drum means.

4. The apparatus of claim 1 wherein the object is a tablet having a peripheral edge separating two substantially symmetrical faces, and wherein the longitudinal pocket is configured to retain therein portions of one of the faces of the tablet.

5. The apparatus of claim 1 wherein the hopper further comprises a plurality of guide means for guiding the plurality of objects into the cavities.

6. The apparatus of claim 5 wherein the object is a tablet having a peripheral edge separating two substantially symmetrical faces, and wherein the plurality of guide means are juxtaposed and spaced apart so that the tablets are capable of dropping between adjacent guide means along their peripheral edge, with their faces adjacent to the guide means.

7. The apparatus of claim 1 wherein the re-orienting means is an essentially arcuate back guide having substantially the same curvature as the drum means.

8. The apparatus of claim 7 wherein the re-orienting means is adjustably positioned with respect to the drum means.

9. The apparatus of claim 7 wherein portions of the re-orienting means are spaced away from the drum means at a distance which, in combination with the depth of the longitudinal pocket of the cavities, is substantially equal to the thickness of the object.

10. The apparatus of claim 9 wherein the trailing edge of the re-orienting means is spaced away from the drum means at a distance which, in combination with the depth of the longitudinal pocket of the cavities, is substantially equal to the thickness of the object.

11. The apparatus of claim 10 wherein the leading edge of the re-orienting means is spaced further from the drum means than is the trailing edge.

12. The apparatus of claim 11 wherein the leading edge of the re-orienting means is spaced away from the drum means at a distance which is sufficient to permit an object positioned in the radial pocket to move edgewise into the longitudinal pocket.

13. The apparatus of claim 1 wherein the conveyor means includes a plurality of carrier means which are adapted to be serially drawn into position beneath the drum means, to accept objects therefrom.

14. The apparatus of claim 13 wherein the carrier means are connected together to form an endless conveyor means.

15. The apparatus of claim 13 wherein the carrier means have a cavity capable of accepting an object delivered from the drum means.

16. The apparatus of claim 15 wherein the conveyor means and the drum means are operatively associated with each other so that the cavities of the carrier means are brought into alignment with the cavities of the drum means.

17. The apparatus of claim 13 wherein the object is a tablet having a peripheral edge separating two substantially symmetrical faces, and wherein the cavities of the carrier means are configured to substantially conform to the shape of one face of the tablets.

18. The apparatus of claim 1 further comprising means for printing indicia upon the object transported to the printing means by the conveyor means.

19. The apparatus of claim 1 wherein at least some of the cavities of the drum means receive objects from the hopper.

20. The apparatus of claim 19 wherein the majority of the cavities of the drum means receive objects from the hopper.

21. The apparatus of claim 1 further comprising brush means in rotary arrangement with respect to the drum means, positioned tangentially to the drum means, between the hopper and the re-orienting means.

22. The apparatus of claim 1 further comprising means for assisting movement of objects within the cavities of the drum means.

23. The apparatus of claim 22 wherein the movement assisting means comprises an air chest which communicates at one end with the cavities of the drum means.

24. The apparatus of claim 23 wherein positive pressure is applied to the air chest.

25. The apparatus of claim 23 wherein negative pressure is applied to the air chest.

26. The apparatus of claim 22 wherein the movement assisting means comprises a nozzle adapted to direct a jet of air into the cavities of the drum means.

27. A method for transferring, in a substantially uniform orientation, a plurality of objects from a hopper adapted to contain the plurality of objects to a conveyor means for further processing, using a transfer drum means in rotary arrangement relative to the hopper, adapted to receive objects from the hopper with a plurality of periphially spaced cavities having a first, substantially radially aligned pocket and a communicating second, substantially longitudinally aligned pocket, which method comprises introducing the objects radially, from the hopper, into the radially aligned pocket of the cavities of the drum means, re-orienting the objects within the cavities by rotating the object from the substantially radially aligned pocket to the substantially longitudinally aligned pocket, and rotating the object about an axis extending generally in the direction of movement of said drum means, and delivering the re-oriented objects from the substantially longitudinally aligned pocket to the conveyor means in a substantially longitudinal direction independent of the radial position of the pocket.

28. The method of claim 27 wherein the object is a tablet having a peripheral edge separating a pair of substantially symmetrical faces, and wherein the tablet is introduced within the radial pocket endwise, with its peripheral edge aligned radially, and its faces aligned generally parallel with the direction of travel of the drum means.

29. The method of claim 28 wherein, after rotation, the tablet is substantially longitudinally oriented with respect to the drum means with its faces positioned in a substantially longitudinal direction with respect to the drum means.

30. The method of claim 27 further comprising positioning a guide means adjacent to the drum means to assist the object in its re-orientation.

31. The method of claim 30 further comprising decreasing the spacing between the guide means and the drum means as the object is re-oriented within the cavity, assisting the object in assuming its proper orientation.

32. The method of claim 31 wherein the guide means is adjustably positioned with respect to the drum means.

33. The method of claim 28 further comprising introducing the tablets into the hopper in random orientation.

34. The method of claim 33 further comprising guiding the tablets within the hopper so that they rest on their peripheral edges, their sides being laterally positioned to the hopper.

35. The method of claim 27 further comprising, after delivering the objects to the conveyor means, printing indicia upon an exposed face of the longitudinally positioned object.

36. The method of claim 27 further comprising assisting the proper positioning of the objects within the cavities of the drum means using additional positioning means.

37. The apparatus of claim 1 wherein the transfer drum and the means for re-orienting the objects are cooperatively associated so that the objects which are in the radial position are transferred directly from the radial to the longitudinal position.

38. The apparatus of claim 37 wherein the objects are transferred directly from the stated position without going through an intermediate transverse position.

39. Apparatus for transferring a plurality of objects from a storage station to a work station, each of said objects having oppositely disposed faces joined along edges, said apparatus comprising:

guide means for supplying said objects from said storage station on one of their edges with said faces disposed generally vertically;

a rotating transfer drum having a plurality of cavities, each cavity having a radial pocket sized and disposed to receive one of said objects from said guide means with said edges positioned one behind the other with respect to the direction of movement of said drum and a peripheral pocket sized and disposed to receive one of said objects from said radial pocket with said edges oriented generally in said direction of movement of said drum and said faces at different radial distances from the axis of rotation of said drum;

orienting means adjacent the surface of said rotating transfer drum for restricting radially outward movement of said objects from said radial pockets and for guiding said objects into said peripheral pockets;

and conveying means for receiving said objects from said peripheral pockets for delivery to said work station.

40. Apparatus according to claim 39 wherein said guide means are adjacent said rotating transfer drum above said axis of rotation.

41. Apparatus according to claim 40 wherein the leading end of said peripheral pocket is ahead of said radial pocket with respect to said direction of movement of said rotating transfer drum.

42. Apparatus according to claim 41 wherein said orienting means include a curved surface extending along said surface of said rotating transfer drum from above said axis of rotation of said drum to a position at which said objects are received by said conveying means and the distance between said curved surface and said surface of said drum gradually diminishes from an amount which permits said objects to move radially outward from said radial pockets to an amount which confines said objects to said peripheral pockets.

43. Apparatus according to claim 42 wherein said conveying means are below said rotating transfer drum and said objects are released to said conveying means from said drum at the lowermost rotary position of said drum.

44. Apparatus according to claim 43 wherein said radially outward movement of said objects is due solely to said movement of said rotating transfer drum.

45. Apparatus according to claim 39 wherein said rotating transfer drum has a plurality of rows of said cavities each extending in said direction of movement of said drum.

46. Apparatus according to claim 42 wherein said curved surface and said guide means are on opposite sides of a vertical plane extending through said axis of rotation of said rotating transfer drum.

* * * * *